United States Patent [19]

Melaja et al.

[11] 3,864,406
[45] Feb. 4, 1975

[54] PROCESS FOR THE PRODUCTION OF MANNITOL AND SORBITOL

[75] Inventors: Asko J. Melaja; Lauri Hämäläinen, both of Kantvik, Finland

[73] Assignee: Suomen Sokeri Osakeyhtio (Finnish Sugar Company), Helsinki, Finland

[22] Filed: Apr. 25, 1973

[21] Appl. No.: 354,392

[52] U.S. Cl. ............................................ 260/637 R
[51] Int. Cl. ...................... C07c 29/24, C07c 31/26
[58] Field of Search ......... 260/637 R, 643 G, 635 C

[56] References Cited
UNITED STATES PATENTS

| | | | |
|---|---|---|---|
| 2,524,414 | 10/1950 | Wolfrom et al. | 260/637 R |
| 3,021,374 | 2/1962 | Radzitsky | 260/643 G |
| 3,134,814 | 5/1964 | Sargent et al. | 260/637 R |
| 3,632,656 | 1/1972 | Unver | 260/637 R |

FOREIGN PATENTS OR APPLICATIONS

| | | | |
|---|---|---|---|
| 1,025,813 | 4/1966 | Great Britain | 260/635 C |

OTHER PUBLICATIONS

Samuelson et al., "Acta Chemica Scandinavica," Vol. 22 (1968), pages 1252–1258.
Zill et al., "J. Am. Chem. Soc.," Vol. 75 (1953), pages 1339–1342.
Dowex, "Ion Exchange," 1964, pp. 4, 31.

*Primary Examiner*—Joseph E. Evans
*Attorney, Agent, or Firm*—Brumbaugh, Graves, Donohue & Raymond

[57] ABSTRACT

A method for separating mannitol and sorbitol from a solution containing mannitol and sorbitol, including the step of chromatographic fractionation to provide an aqueous solution containing a high level mannitol and an aqueous solution containing a high level of sorbitol. When desired, aqueous solutions of pure mannitol (free from sorbitol and unhydrogenated sugar) and pure sorbitol (free from mannitol and unhydrogenated sugar) may be obtained.

7 Claims, No Drawings

PROCESS FOR THE PRODUCTION OF MANNITOL AND SORBITOL

This invention relates to a process for separating mannitol and sorbitol, from aqueous solutions containing both polyols, utilizing chromatographic separation techniques.

The prior art is replete with processes described as being suitable for producing mannitol and sorbitol. Some conventional processes are described in Deut. Offenlegung 2,025,314, Verfahren zur Herstellung von Mannit. Atlas. Chem. Ind. 1971; Deut. Offenlegung 1,268,606, Verfahren zur Herstellung von Mannit. Atlas Chem. Ind. 1968; French Patent 1 58496, Process for the Preparation of Polyalcohols from Carbohydrates, Nagynyomasu Kiserleti Intezet; U.S. Pat. No. 3,622,456, Process for Producing Mannitol by Fermentation, Onishi et al.; Wünsche L. et al., Microbiological Conversion of Fructose to Mannitol, Zeitschr. allgemeine Mikrobiologie, 1966 No. 6 pp. 323–328.

Mannitol is normally obtained by the catalytic hydrogenation of invert sugar (Kirk-Othmer: Encyclopedia of Chemical Technology, Vol. 1, p. 581, 1967). Also, microbiological methods for the preparation of mannitol from fructose have been described (U.S. Pat. No. 3,622,456, recited above and Wünsche et al. recited above). Mannitol also may be extracted from seaweed, (*Laminaria claustroni*) and small amounts of mannitol are obtainable when glucose is hydrogenated to sorbitol. However, hydrogenated invert sugar is the most important economic source of mannitol.

When the invert sugar is hydrogenated, a mixture of mannitol and sorbitol is obtained. The normal composition is 25% mannitol and 75% sorbitol. Improvements in the method have made it possible to obtain 30% mannitol. Recovery of mannitol from the mixture is by crystallization. However, recovery by crystallization has two major drawbacks. Firstly, a large amount of mannitol remains in solution following crystallization and cannot be recovered economically. Secondly, impurities present in the solution will crystallize with mannitol, thus required successive recrystallizations to purify the solid mannitol product. These successive recrystallization steps add greatly to the cost of substantially pure mannitol.

Production of substantially pure sorbitol is beset with similar economic and process drawbacks.

In accordance with the present invention, an improved method for the production of mannitol and sorbitol from aqueous solutions containing these polyols has now been developed in which such solutions are subjected to chromatographic fractionation to obtain highly purified and pure fractions of mannitol as well as highly purified and pure fractions of sorbitol. The chromatographic fractionation step is preferably accomplished by passing the solution through an alkaline earth metal salt of a polystyrene sulfonate cation exchange resin, cross coupled with di-vinyl benzene, the column preferably having a height of from about 2.5 to about 5 meters.

One of the advantages of the process of this invention is that it is capable of providing aqueous solutions of pure mannitol (free from sorbitol and unhydrogenated sugars) as well as solutions of pure sorbitol (free from mannitol and unhydrogenated sugars) without the expensive recrystallizations of the prior art processes. Only one crystallization step is necessary to obtain pure mannitol or pure sorbitol from the pure aqueous solutions.

EXAMPLE

As an example of the separation of mannitol from sorbitol by chromatographic fractionation in accordance with the process of the present invention a column of ion exchange resin, specifically a sulfonated polystyrene cation exchange resin, cross-coupled with 3.5% di-vinyl benzene in calcium form, was provided in a column 3.5 meters in depth and 22.5 centimeters in diameter. The mean particle size of the resin was 0.25 millimeters.

The column was prepared for use by submerging it in water. The feed solution had a solids concentration of 35% and a polyol composition of 26.5% mannitol and 73.5% sorbitol with traces of unhydrogenated sugars.

The feed solution was fed uniformly across the column at a temperature of 55°C and a linear feed rate of 0.30 meters per hour (12 liters per hour). The total amount of solution fed was equivalent to 2.1 kilograms of dry substance.

Thereafter, water was fed to the column at the same feed rate and temperature; successive fractions were collected and analyzed, with the following results:

| 2 Liter Fractions | Dry Substance, Grams | | |
|---|---|---|---|
| | Unhydrogenated Sugars | Mannitol | Sorbitol |
| 1 | 7 | — | — |
| 2 | 12 | 2 | — |
| 3 | 5 | 24 | — |
| 4 | — | 72 | — |
| 5 | — | 84 | — |
| 6 | — | 113 | — |
| 7 | — | 101 | — |
| 8 | — | 77 | 2 |
| 9 | — | 48 | 17 |
| 10 | — | 24 | 91 |
| 11 | — | 7 | 162 |
| 12 | — | 2 | 176 |
| 13 | — | 1 | 168 |
| 14 | — | — | 150 |
| 15 | — | — | 137 |
| 16 | — | — | 128 |
| 17 | — | — | 115 |
| 18 | — | — | 97 |
| 19 | — | — | 79 |
| 20 | — | — | 65 |
| 21 | — | — | 48 |
| 22 | — | — | 34 |
| 23 | — | — | 24 |
| 24 | — | — | 17 |
| 25 | — | — | 10 |

Fractions 1–3 containing the unhydrogenated sugars were combined and set aside. Fractions 4–10 were combined to provide an aqueous solution containing 82.4% mannitol, from which crystallized mannitol is subsequently obtained. The combination of fractions 11–25, provided an aqueous solution containing 99.2% sorbitol. Of course, a combination of fractions 4–7 gives an aqueous solution containing pure mannitol and a combination of fractions 14–25 provides an aqueous solution containing pure sorbitol.

We claim:

1. The method of separating mannitol and sorbitol from solutions consisting essentially of both polyols and water which comprises
   a. providing a column of alkaline earth metal salt of a polystyrene sulfonate cation exchanger, cross coupled with di-vinyl benzene;
   b. submerging the column of resin in water;

c. feeding a solution consisting essentially of water, mannitol and sorbitol, in uniform supply to the resin surface in the column at a flow rate of 0.2 to 1.5 cubic meters per hour per square meter of the cross-section of the resin column followed by elution of the column with water; and d. recovering successively from the downstream side of the resin bed
  1. a first fraction rich in mannitol, and
  2. a second fraction rich in sorbitol.

2. The method of claim 1, wherein the alkaline earth metal salt of (a), is calcium.

3. The method of claim 1, wherein the column of the cation exchanger is from 2.5 to 5 meters in depth.

4. The method of claim 1, wherein the solution consisting essentially of water, mannitol and sorbitol is obtained by hydrogenation of invert sugar.

5. The method of claim 1, wherein the solution consisting essentially of water, mannitol and sorbitol has a dry material content of 25 to 55% by weight.

6. The method of claim 1, wherein the fraction rich in mannitol is crystallized and the crystals separated from the balance of the solution to provide crystals of substantially pure mannitol.

7. The method of claim 4, wherein the fractions recovered successively from the downstream side of the resin bed include
  1. a first fraction containing unhydrogenated sugars and a low level of mannitol,
  2. a second fraction rich in mannitol, and
  3. a third fraction rich in sorbitol.

* * * * *